United States Patent Office 3,521,804
Patented July 28, 1970

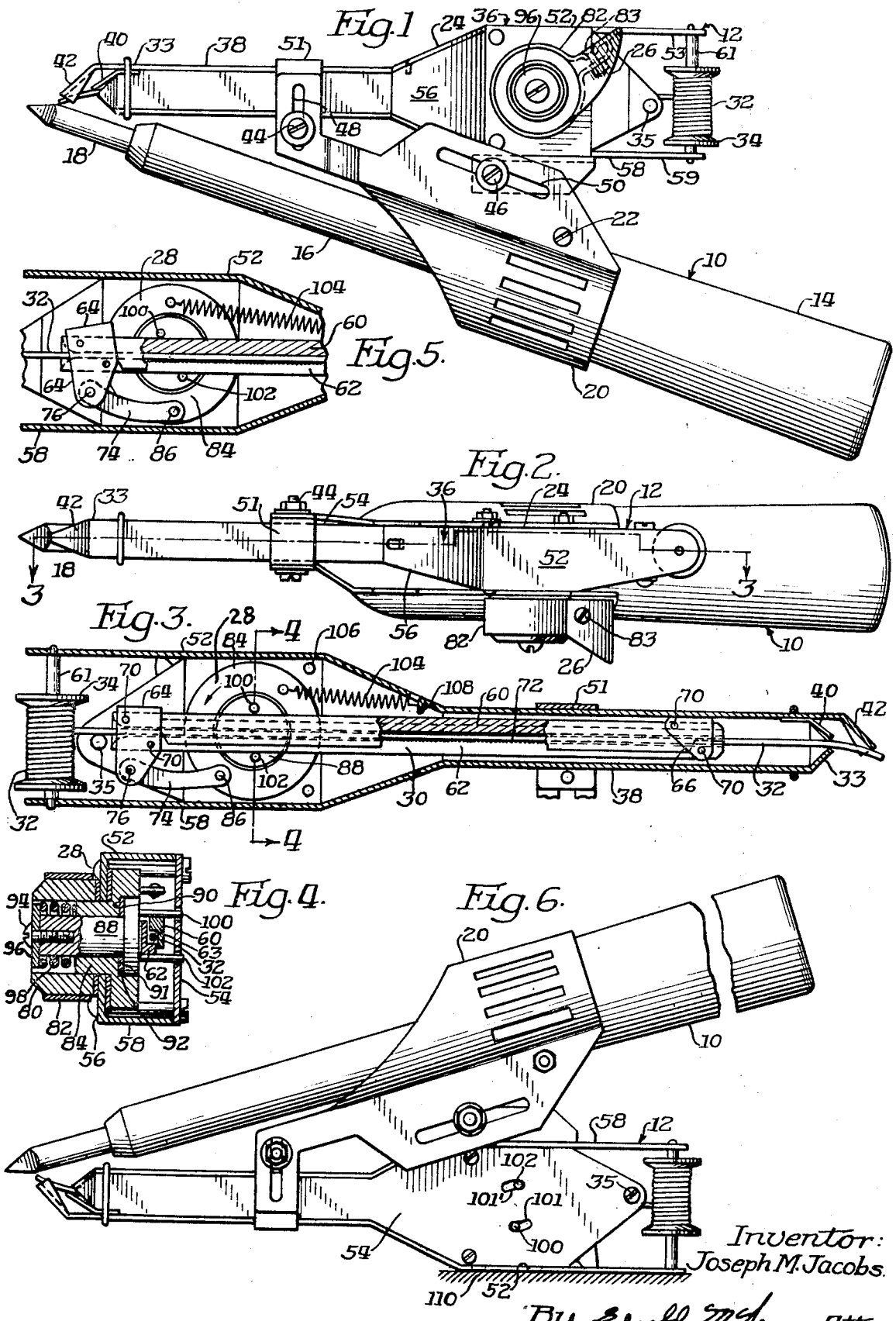

3,521,804
STRIP SOLDER FEEDING DEVICE
Joseph M. Jacobs, 3432 S. Wisconsin Ave.,
Berwyn, Ill. 60402
Filed Jan. 29, 1968, Ser. No. 701,438
Int. Cl. B23k 3/06
U.S. Cl. 228—52                                                  9 Claims

ABSTRACT OF THE DISCLOSURE

Apparatus mountable on a soldering iron for feeding strip solder to the heated tip thereof. The apparatus incorporates a novel parallelogram track arrangement for sequentially gripping and advancing the strip solder through the housing to the heated tip. During periods of nonuse the solder feeding device may be utilized as a rest or support.

---

This invention relates in general to auxiliary soldering apparatus, and in particular to a strip solder feeding device for feeding solder to the heated tip of a soldering implement. More particularly, this invention relates to a solder feeding device mountable on a hand-held soldering iron which enables one-handed manipulation of the iron while simultaneously feeding strip solder to its heated tip. In addition, the invention relates to a solder feeding device which may also be used as a stand for supporting the heated tip during periods of nonuse.

The conventional hand-held soldering iron, while very useful and versatile in industry and in the home, is very awkward and time consuming to use. This is primarily due to many functions which have to be accomplished simultaneously while soldering. These functions include holding the soldering iron in one hand to manipulate its heated tip; properly supporting the workpiece to be soldered, with a second hand; and simultaneously feeding strip solder to the junction between the soldering iron tip and the workpiece. Of course, feeding the strip solder is very difficult since both of the operator's hands are occupied.

This is typically overcome by arranging the workpiece to be self-supporting, or for small workpieces, by feeding a generous quantity of solder to the heated tip, and thereafter capillarily transferring it to the workpiece. Another method of overcoming the problem, although one not often used, is to stationarily secure the soldering iron and transport the workpiece and strip solder to its heated tip. Each of the above arrangements require considerable time in providing support for the various components, or require a considerable amount of dexterity and familiarity with the art of soldering. Where a large number of unsupported workpieces must be soldered quickly, the problem bceomes more difficult, hence the time consumed during soldered becomes untenable.

Another problem with typical soldering irons is that a stationary support must be used for resting the heated tip during intervals of nonuse, in order to prevent burning the work surface such as a table or bench. The stationary support inhibits safe use of the soldering iron in other locations, since a rest or support is not always readily available.

This invention obviates the above-mentioned problems and difficulties by providing a device capable of being secured to varying size and style soldering irons for feeding strip solder to the heated tip thereof. With this invention, strip solder can be fed evenly to the heated tip of a soldering iron while he user retains full control over the rate of feed. The device is operable with one finger, preferably the thumb, of the same hand used to support the soldering iron. In addition, the invention provides an integral support for the heated tip so that the soldering iron can be placed on any surface without regard to the availability of a stand or rest.

While other solder feeding devices are available, many of them are integral with the soldering iron and lack the desirable feature of simple adaptability for the purpose of updating an old soldering iron or using the same solder feeding device for several soldering irons. In addition, with integral solder feding devices, should a defect occur in the soldering iron, the feeding device and soldering iron would have to be discarded.

Other prior art solder feeding devices are separate from the soldering irons and are adaptable thereto, but they are relatively complex in operation, are relatively costly to manufacture, and substantial wastage is incurred during use due to the inability to feed short lengths of solder at the end of the supply spool.

The solder feeding device of the instant invention overcomes many of the inadequacies of prior art devices by providing a unit which is readily adaptable to a multiplicity of size and style soldering irons, is extremely light in weight, may be manufactured from parts which are readily stamped rather than machined thus reducing its cost, is very reliable, and provides full control of the solder through incorporation of a novel solder feeding track. In addition, the solder feeding device of the invention reduces the solder wastage to a minimum, such as the order of two inches for an entire roll of solder. Further, the invention is capable of being used with strip solder of varying dimensions and cross-sectional configurations.

In accordance with the invention, the solder feeding device comprises a housing mountable on a soldering iron with its forward end adjacent the heated tip. The feeding device supports a solder supply spool from which strip solder is fed to the tip by a trigger acting through a clutch to sequentially clamp the solder in a novel guide track and move the track and solder toward the forward end. The upper surface of the housing and an extremity of the trigger define a stable base on which the soldering iron may be supported with the heated tip spaced away from the work surface.

Accordingly, it is an object of this invention to provide a solder feeding device of simple design for feeding strip solder to the heated tip of a soldering iron.

Another object of this invention is to provide a solder feeding device adaptable to many styles and types of soldering irons for feeding strip solder to the heated tips thereof.

A further object of this invention is to provide a solder feeding device capable of feeding strip solder of varying sizes and cross-sectional configurations to the heated tip of a soldering iron.

A still further object of this invention is to provide a strip solder feeding device which maintains control over the solder along a substantial length thereof while feeding it to the heated tip.

A still further object of this invention is to provide a strip solder feeding device wherein solder wastage is minimal.

Another object of this invention is to provide a solder feeding device which may be used to safely support the soldering iron during intervals of nonuse.

A feature of this invention resides in the use of a novel solder feeding track which is clampable about a length of strip solder and longitudinally movable through the feeding device thereby advancing a quantity of solder to the heated tip.

Other objects of this invention will become apparent upon an examination of the following description taken in conjunction with the accompanying drawings wherein:

FIG. 1 is an elevational view of the invention mounted on a soldering iron.

FIG. 2 is a top plan view of the invention mounted on a soldering iron.

FIG. 3 is a slightly enlarged elevational sectional view of the solder feeding device without the iron, taken along offset line 3—3 of FIG. 2.

FIG. 4 is an enlarged elevational sectional view taken along line 4—4 of FIG. 1 showing the slip clutch of the invention.

FIG. 5 is an elevational view showing a segment of the track and the clutch in a different operational position.

FIG. 6 is an elevational view to the same scale as FIG. 1 showing the invention used as a stand or support for the soldering iron.

Turning to consideration of the drawings, and in particular to FIGS. 1, 2 and 3, there is shown a conventional electric soldering iron generally referred to by reference numeral 10, having a solder feeding device 12 secured thereto. The soldering iron includes a thermally nonconductive handle 14 for conveniently handling an enclosed heating element 16 which supplies heat by conduction to a soldering tip 18. The solder feeding device is secured to the soldering iron by an adjustable clamp 20 located approximately at the iron's center of gravity. The clamp is firmly secured by a threaded fastener 22, thus facilitating mounting the feeding device on an iron and its subsequent removal at the user's option.

Solder feeding device 12 generally comprises an outer housing 24 having a trigger 26 which is manually operable for driving a slip clutch assembly 28 which sequentially clamps a track assembly 30 about a length of strip solder 32 and drives the track members toward a forward end or terminus 33, advancing the solder out of the end to tip 18.

More particularly the outer housing comprises a central portion 36 containing most of the operating mechanism, and an integral barrel portion 38. The barrel includes one-way advancement means at terminus 33 comprising a spring member 40 cooperating with the housing, and a solder deflector 42 for guiding the strip solder 32 to the heated tip. Outer housing 24 is adjustably secured to clamp 20 by a pair of threaded fasteners 44 and 46 which cooperate with two clamp slots 48 and 50, respectively. A U-shaped clip 51 partially encircles the barrel and is held by fastener 44. By loosening fasteners 44 and 46 the solder feeding device may be moved toward or away from the heated tip, in either the longitudinal or vertical direction, thereby achieving substantial versatility for use with many different size and style soldering irons.

The central housing portion and the barrel are formed of a top wall 52, side walls 54 and 56, and a bottom wall 58. Top and bottom walls 52 and 58 include rearwardly extending, generally parallel legs 53 and 59, respectively, which provide support for an axle 61 for rotatably captivating solder supply spool 34. The axle and supply spool may be removed for renewing an expended solder supply by manually urging the legs apart. A fresh solder spool may then be inserted over the axle, and the assembly replaced. The solder is passed over a guide pin 35 which assists in maintaining the proper level of the supply spool on the axle.

Housing walls 52, 54, 56 and 58 define an enclosed volume wherein a pair of track members 60 and 62 are supported. As best seen in the cross-sectional view of FIG. 4, each track member has a generally L-shaped cross section and they are arranged to define a hollow, longitudinal space 63 therebetween through which the strip solder 32 is trained. Adjacent ends of the track members are pivotably connected to each other by links 64 and 66 and pivot members 70 which may comprise rivets, pins, or other similar connecting means. Each link is generally U-shaped and has a width slightly greater than the combined track width. This insures alignment of the track members to prevent untraining of the strip solder.

The pivot connections of adjacent track ends are offset, as seen in FIG. 3, thus the tracks and links define a pivotably connected parallelogram which may be expanded or contracted, by means set forth below, to effect a corresponding vertical increase or decrease between adjacent track members. As the parallelogram is contracted the space 63 between the track members decreases, causing the members to contact and grip the strip solder trained therethrough. This gripping action may be enhanced by knurling one of the track surfaces, such as surface 72 of member 62. After the track members are contracted, the entire track assembly and the strip solder gripped thereby may be advanced toward terminus 33. The strip solder ahead of the track is sufficiently rigid to advance a corresponding amount.

Contraction and forward movement of the track assembly is effected by trigger 26 acting through slip clutch assembly 28 which effects a lost motion function. As best seen in FIGS. 3, 4 and 5, the slip clutch assembly includes an outer collar 80 having trigger 26 secured thereto by a compression band 82 and fastener 83. The collar is coupled by a press-fit to a clutch driving member 84 which is mounted for rotation in housing wall 56. The driving member is thus fixed for corotative movement with trigger 26 through collar 80. Driving member 84 is coupled to the track assembly by an extending pin 86 and an arm 74 pivotably connected thereto. The arm is connected to the track by a pivot 76 through a depending extension of link 64 and thus converts partial rotational motion of driving member 84 to rectilinear motion for the track assembly.

The slip clutch assembly further includes a driven clutch member 88 located interiorly of the driving member and axially aligned therewith. The driven member includes a clutch face 90 which cooperates with an adjacent clutch face 91 of the driving clutch member, through a washer shaped slip clutch plate 92 which may be fabricated of nylon. The clutch members are biased against the clutch plate for frictionally coupled rotation, by compression spring 98 retained by a threaded fastener 94 and a washer 96. Driven member 88 includes a pair of extending pins 100 and 102 which straddle the track members. Responsive to partial rotation of the driven member by trigger movement, the pins contact the tracks and urge them together, thereby exerting a clamping force on the strip solder. Each of the pins extend through side wall 54 and cooperate with slots 101 and 101' therein (see FIG. 6) to limit total movement of the driven member.

Turning now to the operational aspect of the solder feeding device, as the user desires to advance a quantity of strip solder to the heated tip, the trigger 26 is depressed, rotating clutch driving member 84 clockwise as viewed in FIG. 1 (counterclockwise as viewed in FIGS. 3 and 5). During initial trigger movement, driven member 88 and pins 100 and 102 are rotated until strip solder 32 is engaged by track members 60 and 62 of track assembly 30. As seen in FIG. 5, the pins have compressed the track members, causing them to continuously grip the strip solder as track assembly 30 is further advanced. Also driving member 84 connected by arm 74 to link 64, causes a moment to be effected on the linkage to assist contracting the members. During initial forward rotation, the track is being simultaneously compressed and moved forward, but until the solder is gripped, no solder advancement is effected. When the solder is tightly gripped, the clutch begins to slip upon additional trigger movement, preventing further rotation of driven member 88.

On the other hand, driving member 84 continues to rotate and transmits continual movement through arm 74 to the track assembly, causing it to travel forward toward terminus 33, advancing solder to the heated tip. The advancing solder is guided by deflector 42 to the appropriate area of the tip.

After the trigger has been depressed to its maximum limit, as defined by the maximum forward movement of the track assembly, it is released and returns to its original position under the biasing influence of a return spring 104. The return spring extends between a pin 106 protruding from the driving member and a tab 108 struck from the top housing wall. The parallelogram configuration of the track assembly allows it to expand easily and slide back along the strip solder in preparation for gripping the solder again and advancing an additional quantity toward the heated tip. During return of the track to its original position, spring member 40 fabricated of phosphor bronze or other suitable material, forms one-way advancement means by nicking the soft solder to prevent its withdrawal back into the housing.

Repeated operation of the trigger advances additional quantities of solder through the housing. The device functions well even after the supply spool has been depleted of solder, and advances the solder remaining in the track until the tail end reaches the forward end of the track assembly. Thus, the only wastage is the small length of solder between the end of the track and the forward end of the barrel.

The configuration of the track members and the longitudinal volume 63 defined thereby, allows utilization of stripsolder of varying sizes and cross-sectional shapes. Thus, a larger diameter solder may be substituted for the solder illustrated, and even flat solder may be accepted and advanced by the parallelogram track assembly.

Referring now to FIG. 6, a different aspect of the solder feeding device is illustrated. In FIG. 6, the solder feeding device and the iron have been inverted and the device serves as a stand or rest for supporting the heated iron on a flat work-surface diagrammatically indicated at 110, during periods of nonuse. When so used, the feeding device and its clamped soldering iron are inverted and rest on top wall 52 of the housing which provides a broad base for stable support. In addition, the tip of trigger 26 is in same plane as the top wall 52 and provides additional stabilizing support for the soldering iron. Stability is further insured by arranging the device such that the center of gravity of the iron extends through the support base. Thus, a handy, integral support is provided to prevent the heated tip from coming into contact with the work-surface. The orientation of the soldering iron above the feeding device prevents heat transmission to the housing by convection. As can be appreciated, this is very desirable during long periods of nonuse.

What has been described is a solder feeding device adaptable to various size soldering irons for selectively feeding strip solder to the heated tip. The strip solder is under positive control of the user at all times by utilization of a novel track advancement arrangement which grips a substantial length of the solder. In addition, the solder feeding device serves as a support for the iron during periods of nonuse.

It is obvious that upon study of those skilled in the art, the disclosed invention may be altered or modified both in physical appearance and construction without departing from its inventive concept. Therefore, the scope of protection to be given this invention should not be limited by the embodiment described above, but should be determined by the essential descriptions thereof which appear in the appended claims.

The embodiments of the invention in which an exclusive property or privilege is claimed are as follows:

1. Apparatus for feeding strip solder to the heated tip of a soldering iron, comprising: a housing including means for securement thereof to said soldering iron; track means supported for movement within said housing comprising first and second longitudinal, substantially parallel track members having said strip solder trained therebetween, and manually operated means cooperating with said track members to urge the members toward each other for clamping said strip solder therebetween and imparting movement to said members whereby a quantity of strip solder is advanced to said heated tip.

2. Apparatus for feeding strip solder as set forth in claim 1 wherein said track means further comprise a pair of links, one of said links pivotably connecting first adjacent ends of said track members, and the remaining link pivotably connecting second adjacent ends of said track members, said links and said track members assuming a generally parallelogram shape; and including additionally: arm means connecting said manually operated means to one of said links for imparting longitudinal movement to said track.

3. Apparatus for feeding strip solder as set forth in claim 2 wherein said track members substantially enclose the strip solder trained therethrough for preventing untraining thereof; and including additionally: means integral with said housing cooperating with said strip solder for only allowing movement of said solder toward said heated tip; deflector means supported by said housing adjacent said heated tip for guiding said strip solder thereto; and spool means containing a supply of strip solder to be advanced by said track members to said heated tip.

4. Apparatus for feeding strip solder as set forth in claim 3 wherein said manually operable means comprise trigger means accessible externally of said housing and lost motion means coupling said trigger to said track members for urging said track members together responsive to trigger movement.

5. The apparatus as set forth in claim 3 wherein said manually operable means comprise:
   a finger operated trigger accessible externally of said housing;
   a first clutch element secured for corotative movement with said trigger;
   a second clutch element driven by said first clutch element through friction clutch means;
and wherein said arm is pivotably connected to said first clutch element for imparting positive longitudinal movement to said track responsive to trigger movement; said second clutch element including means cooperating with each of said track members for urging said track members together during initial trigger movement and imparting a given clamping force on said strip solder; said clutch slipping and said clamping force remaining substantially constant during additional trigger movement while said first element continues to impart longitudinal movement to said track.

6. The apparatus as set forth in claim 5 wherein said manually operated means further comprise spring means biasing said clutch elements together; and including additionally: return spring means secured between said housing and said first clutch element for returning said clutch element and said trigger to a normal position during which the grip on said strip solder is released and said track members are retracted from said tip.

7. In combination with a soldering iron having a heated tip:
   a solder feeding means secured to said iron for feeding strip solder to said tip;
   said solder feeding means including a housing having a manually operated trigger extending laterally from a side wall thereof;
   said trigger including an extremity portion extending to the top wall of said housing and forming a support base providing stable support on a work surface for said soldering iron and its heated tip during periods of nonuse with convected heat from said tip directed away from said feeding means.

8. The combination as set forth in claim 7 wherein said solder feeding means comprise:
   parallelogram track means adapted for longitudinal movement within said housing toward a forward terminus thereof adjacent the heated tip;

strip solder trained through said track means and said forward terminus; and slip clutch means including a driving member fixedly connected to said trigger means and coupled to said track means for imparting longitudinal movement thereto, a driven member frictionally coupled to said driving member, said driven member cooperating with said track means for clamping said track about said strip solder and said driving means imparting longitudinal movement to said track for advancing said solder to said tip.

9. Apparatus for feeding strip solder to the heated tip of a soldering iron, comprising: a generally longitudinal housing having a forward terminus including integral one-way means for allowing only forward movement of the strip solder therethrough; means for securing the housing to said soldering iron with the forward terminus disposed adjacent said heated tip; track means supported for movement within said housing; strip solder trained through said track means and said forward terminus and substantially totally enclosed by said track; spool means for storing a supply of strip solder; and manually operated means including means for sequentially clamping said track about said strip solder and moving said track toward the forward terminous whereby a quantity of strip solder having a length substantially equal to the distance of track movement is advanced through said one-way means to the heated tip.

References Cited
UNITED STATES PATENTS 3,395,847   8/1968   Buck _____ 228—53

JOHN F. CAMPBELL, Primary Examiner

R. J. CRAIG, Assistant Examiner

U.S. Cl. X.R.

228—51, 53